(12) United States Patent
Vahtola (10) Patent No.: US 9,400,550 B2
(45) Date of Patent: Jul. 26, 2016

(54) APPARATUS AND METHOD PROVIDING VIEWER FEEDBACK OF OBSERVED PERSONAL USER DATA

(75) Inventor: Miika Juhani Vahtola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 898 days.

(21) Appl. No.: 12/775,424

(22) Filed: May 6, 2010

(65) Prior Publication Data

US 2011/0273436 A1 Nov. 10, 2011

(51) Int. Cl.
| | | |
|---|---|---|
| *G06T 1/00* | (2006.01) | |
| *G06T 11/00* | (2006.01) | |
| *G06F 3/01* | (2006.01) | |
| *G06Q 30/02* | (2012.01) | |

(52) U.S. Cl.
CPC ............ *G06F 3/012* (2013.01); *G06Q 30/0201* (2013.01); *G06F 2203/011* (2013.01)

(58) Field of Classification Search
CPC ....... G06Q 30/02; G06Q 10/10; G06Q 50/01; G06Q 30/0203; H04N 21/44222; H04N 21/466; G06F 17/30873; G06F 2216/15
See application file for complete search history.

(56) References Cited

U.S. PATENT DOCUMENTS

| | | | |
|---|---|---|---|
| 5,774,591 A | 6/1998 | Black et al. | |
| 7,120,880 B1 | 10/2006 | Dryer et al. | |
| 2006/0042483 A1* | 3/2006 | Work et al. ..................... 101/91 |
| 2008/0059578 A1 | 3/2008 | Albertson et al. | |
| 2009/0094247 A1* | 4/2009 | Fredlund et al. ................ 707/10 |
| 2009/0132441 A1* | 5/2009 | Muller et al. ................... 706/11 |
| 2010/0004977 A1* | 1/2010 | Marci et al. .................... 705/10 |

FOREIGN PATENT DOCUMENTS

| | | |
|---|---|---|
| WO | WO 2007/103886 | 9/2007 |
| WO | WO 2009/059065 | 5/2009 |

\* cited by examiner

*Primary Examiner* — Tize Ma
(74) *Attorney, Agent, or Firm* — Harrington & Smith

(57) ABSTRACT

In one or more embodiments described herein, there is provided an apparatus comprising a processor and a memory including computer program code. The memory and the computer code are configured to, with the processor, cause the apparatus to be able to determine a graphical indicator for display to the originator of personal user data. The graphical indicator is a graphical representation of a determined interest value of one or more viewers to the personal user data. This determined interest value is generated using feedback signalling representative of the feedback provided by changes in facial expression of respective viewers to viewing said personal user data.

17 Claims, 5 Drawing Sheets

APPARATUS AND METHOD PROVIDING VIEWER FEEDBACK OF OBSERVED PERSONAL USER DATA

TECHNICAL FIELD/BACKGROUND

The present disclosure relates to the field of facial feedback associated with viewers of content (such as viewer expression, mood and/or emotion, or the like), associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (for example, tele-communication, video-communication, and/or text transmission (Short Message Service (SMS)/Multimedia Message Service (MMS)/emailing) functions), interactive/non-interactive viewing functions (for example, web-browsing, navigation, TV/program viewing functions), music recording/playing functions (for example, MP3 or other format and/or (FM/AM) radio broadcast recording/playing), downloading/sending of data functions, image capture function (for example, using a (for example, in-built) digital camera), and gaming functions.

Streaming live video content across the Internet (via webcams, video-conferences or the like) is commonplace. Users that stream content (such as personal user data) provide this to one or more viewers who watch that content. In particular, generation of personal user data and all kinds of content for sharing has become popular in recent years, resulting in an increase of services for content creators, content consumers and also for providing for interaction between the two (for example, such as Youtube™ and the like).

SUMMARY

In a first aspect, there is provided apparatus comprising:
at least one processor; and
at least one memory including computer program code,
the at least one memory and the computer program code are configured to, with the at least one processor, cause the apparatus to perform at least the following:
determine a graphical indicator for display to the originator of personal user data, the graphical indicator being a graphical representation of a determined interest value of one or more viewers to the personal user data, the determined interest value being generated using feedback signalling representative of the feedback provided by changes in facial expression of respective viewers to viewing said personal user data.

The personal user data may be generated by the originator using a portable electronic device. This may be a substantially live stream to one or more viewers, or may be a stream of recorded user data. The user data may be video content, and may also comprise audio content. Personal user data may comprise one or more of the following:
audio content, video content, text content, image content, static and/or dynamic audio/video/text/image content, and the like. For example, this may include webcasts, audiocasts, webcam chats, social networking profiles, personal/business websites, online photo albums, telephone calls, videoconference calls, and the like.

The viewers may be viewing said user data on an electronic device that may be portable (such as a mobile telephone, PDA, smartphone, laptop, or the like) or may be non-portable (such as a desktop computer, or the like). The viewers may also view said data on electronic systems such as teleconferencing systems (for example, incorporating telephone systems, projectors, video screens, speakers, etc).

Similarly, the apparatus may be provided in any one or more of these types of device/system (such as a feedback system for providing personal user data to viewers and aggregating feedback signalling from the viewers and providing this to the apparatus and/or originator device). The apparatus may also/alternatively be provided as part of a server that may be intermediate to an originator of user data and the viewers viewing said user data.

Changes in facial expression may comprise change in facial reaction to viewing of personal user data. Facial reactions may comprise one or more of: happy, sad, angry, scared, contempt, surprise, confusion, no reaction, etc. Facial expression changes can be considered to be a form of automatic feedback. The term 'automatic' may be considered to encompass feedback that is not consciously/voluntarily provided by the viewer.

The term "change" can be understood to encompass facial reactions to the viewing of personal user data. This can also be understood to include, for example, no actual change in facial expression, or even when a viewer looks away in which case there would be no facial expression to monitor.

The feedback signalling may comprise one or more components that are representative of one or more of the following factors:
respective viewer's emotions, interest level, classified facial expression, unclassified facial expression, emotional state, body language, or the like.

The at least one memory and the computer program code may be configured to, with the at least one processor, cause the apparatus to be able to:
receive said feedback signalling; and
generate the determined interest value using the received feedback signalling.

In some embodiments the feedback signalling may be a video stream of a given viewers face and/or head. In some embodiments the feedback signalling may comprise components that actually provide one or more measures of the aforementioned factors.

In some embodiments the apparatus may receive feedback signalling and calculate/determine the determined interest value from the signalling, or in other embodiments the determined interest value/level may be provided by the signalling and the apparatus does not need to determine the interest level.

The at least one memory and the computer program code may be configured to, with the at least one processor, cause the apparatus to be able to:
generate the determined interest value using the received feedback signalling in accordance with at least one predetermined set of criteria which allow for interpretation of said received feedback signalling to determine changes in facial expression of respective viewers viewing said personal user data.

The at least one predetermined set of criteria may comprise at least one expression rating system.

The determined interest value may have one or more qualities determined with respect to an expression rating system.

This expression rating system may include the Facial Action Coding System (FACS), or the like.

The determined interest value of the one or more viewers may be a measure of respective viewer's responses to the personal user data being viewed.

The graphical representation may provide a representation of the magnitude of the determined interest value based on compiling interest values from a plurality of viewers.

The at least one memory and the computer program code may be configured to, with the at least one processor, cause the apparatus to be able to:
determine a graphical indicator output being graphically representative of the magnitude of the determined interest value.

The at least one memory and the computer program code may be configured to, with the at least one processor, cause the apparatus to be able to:
determine a graphical indicator output being graphically representative of one or more qualities of the determined interest value.

The determined interest value may comprise one or more components of: viewer facial expression, and viewer mood, or any of the aforementioned factors above.

The determined graphical indicator may include one or more of:
distinctly coloured dots/squares/icons/logos/faces, gradient changes in colour, changing facial logos, changing facial expressions, gestures, colours, skin, animation, rendering, transition effects, blinking, flashing, glowing, pulsing, vibration and oscillation.

The at least one memory and the computer program code may be configured to, with the at least one processor, cause the apparatus to be able to:
receive feedback signalling in response to one or more feedback requests, the feedback requests having one or more feedback time windows associated therewith and wherein the respective feedback signalling has a corresponding timestamp associated therewith;
aggregate received feedback signalling having a particular timestamp to a corresponding feedback time window; and
generate the determined interest value for a particular feedback time window using the received feedback signalling aggregated to that particular respective feedback time window.

The apparatus may be selected from one or more of the following:
an electronic device, a portable electronic device, a mobile phone, a server, cloud server, system, feedback system, and a module for any of these.

The electronic device may be a laptop, desktop computer or the like. The portable electronic device may be a PDA (Personal Digital Assistant), mobile telephone, radio telephone, smartphone, or the like.

The electronic device may be a portable or non-portable electronic device.

A server/cloud server may be an intermediate server that allows for provision of personal user data from an originator device to viewer devices and for aggregation of feedback signalling from the viewer devices in response to viewing said content to determine the graphical indicator.

A system/feedback system may be a network that allows for provision of personal user data from an originator device to viewer devices and for aggregation of feedback signalling from the viewer devices in response to viewing said content to determine the graphical indicator.

In a further aspect, there is provided a method comprising:
determining a graphical indicator for display to the originator of personal user data, the graphical indicator being a graphical representation of a determined interest value of one or more viewers to the personal user data, the determined interest value being generated using feedback signalling representative of the feedback provided by changes in facial expression of respective viewers to viewing said personal user data.

The method may also comprise:
receiving said feedback signalling; and
generating the determined interest value using the received feedback signalling.

The method may also comprise:
generating the determined interest value using the received feedback signalling in accordance with at least one predetermined set of criteria which allow for interpretation of said received feedback signalling to determine changes in facial expression of respective viewers viewing said personal user data.

The method may also comprise:
determining a graphical indicator output being graphically representative of the magnitude of the determined interest value.

The method may also comprise:
determining a graphical indicator output being graphically representative of one or more qualities of the determined interest value.

The method may also comprise:
receiving feedback signalling in response to one or more feedback requests, the feedback requests having one or more feedback time windows associated therewith and wherein the respective feedback signalling has a corresponding timestamp associated therewith;
aggregating received feedback signalling having a particular timestamp to a corresponding feedback time window; and
generating the determined interest value for a particular feedback time window using the received feedback signalling aggregated to that particular respective feedback time window.

In a further aspect, there is provided an apparatus comprising:
a determinator for determining a graphical indicator for display to the originator of personal user data, the graphical indicator being a graphical representation of a determined interest value of one or more viewers to the personal user data, the determined interest value being generated using feedback signalling representative of the feedback provided by changes in facial expression of respective viewers to viewing said personal user data.

In another aspect, there is provided an apparatus comprising:
a means for determining a graphical indicator for display to the originator of personal user data, the graphical indicator being a graphical representation of a determined interest value of one or more viewers to the personal user data, the determined interest value being generated using feedback signalling representative of the feedback provided by changes in facial expression of respective viewers to viewing said personal user data.

In still another aspect, there is provided apparatus configured to determine a graphical indicator for display to the originator of personal user data, the graphical indicator being a graphical representation of a determined interest value of one or more viewers to the personal user data, the determined interest value being generated using feedback signalling representative of the feedback provided by changes in facial expression of respective viewers to viewing said personal user data.

In another aspect there is provided a computer readable medium comprising a computer program stored thereon, the computer program comprising computer code configured to, when run on a processor, perform at least the following:

determine a graphical indicator for display to the originator of personal user data, the graphical indicator being a graphical representation of a determined interest value of one or more viewers to the personal user data, the determined interest value being generated using feedback signalling representative of the feedback provided by changes in facial expression of respective viewers to viewing said personal user data.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

DESCRIPTION OF EXAMPLE ASPECTS/EMBODIMENTS

In one or more embodiments described herein, there is provided an apparatus comprising a processor and a memory including computer program code. The memory and the computer code are configured to, with the processor, cause the apparatus to be able to determine a graphical indicator for display to the originator of personal user data. The graphical indicator is a graphical representation of a determined interest value of one or more viewers to the personal user data. This determined interest value is generated using feedback signalling representative of the feedback provided by changes in facial expression of respective viewers to viewing said personal user data.

This personal user data can take many forms. For example, this personal user data may comprise include audio content, video content, text content, image content, static and/or dynamic audio/video/text/image content, and the like. For example, this may include webcasts, audiocasts, webcam chats, social networking profiles, personal/business websites, online photo albums, telephone calls, videoconference calls, and the like.

As indicated in the background section, streaming live content is commonplace. However an issue with this is that in many situations the viewer's faces cannot be observed by the originator of the personal user data (for example, via reciprocal webcams or the like). This is often due to practical reasons, as for a large number of viewers it would not be practical or even possible for the originator to have every viewer's face displayed on their screen whilst trying to provide content. This makes it difficult for the originator to gauge how the respective viewers are responding to the content/user data they are providing.

Some existing systems use feedback rating systems (for example, Youtube™) that viewers can manually select to indicate their interest level. However the viewer actively needs to click this, and to interpret their emotions as a quantitative measure. This is often typically done at the end of viewing of the video content, and may not necessarily be indicative of how their interest level throughout viewing of the video. The abovedescribed apparatus can help to alleviate these issues.

As discussed above, viewers may have involuntary reactions to content/situations/user data that they view. This provides a more useful mapping/indicator as to their actual interest level in user data. In essence, the apparatus above distils the interest level/value of one or more viewers into a meaningful representation for the originator via the graphical indicator. By providing the graphical indicator to an originator of personal user data, the originator can receive/be informed simply and easily of overall viewer interest in the originator's personal user data.

For example, an originator may be providing personal user data to a number of viewers (for example, a webcam user is streaming sound and video content to a number of viewers/subscribers). As the viewers view the personal user data, they will each facially react to the data being viewed. When viewing content/user data, viewer's facial reactions are subconscious involuntary responses to the user data—the viewers do not consciously adopt particular facial expressions.

These facial expressions can be utilised to indicate viewers' interest levels. Therefore, the change in viewers' facial expressions can be monitored and provided via feedback signalling representative of said changes (for example, via reciprocal webcams). The interest level of the viewers can be determined as an interest value (for example, via a cloud server that collectively aggregates such feedback signalling and determines the interest value of the aggregated feedback, and then provides the determined interest value to the apparatus—this variation will be discussed in more detail).

The determined interest value can be used to determine a graphical indicator that is representative of that determined interest value. This graphical indicator can then be provided at the originator device to represent the determined interest value in a simple and easy to read/interpret format. The originator of the personal user data can then meaningfully gauge the interest that their personal user data is creating with the viewers.

Figures 1, 2A:
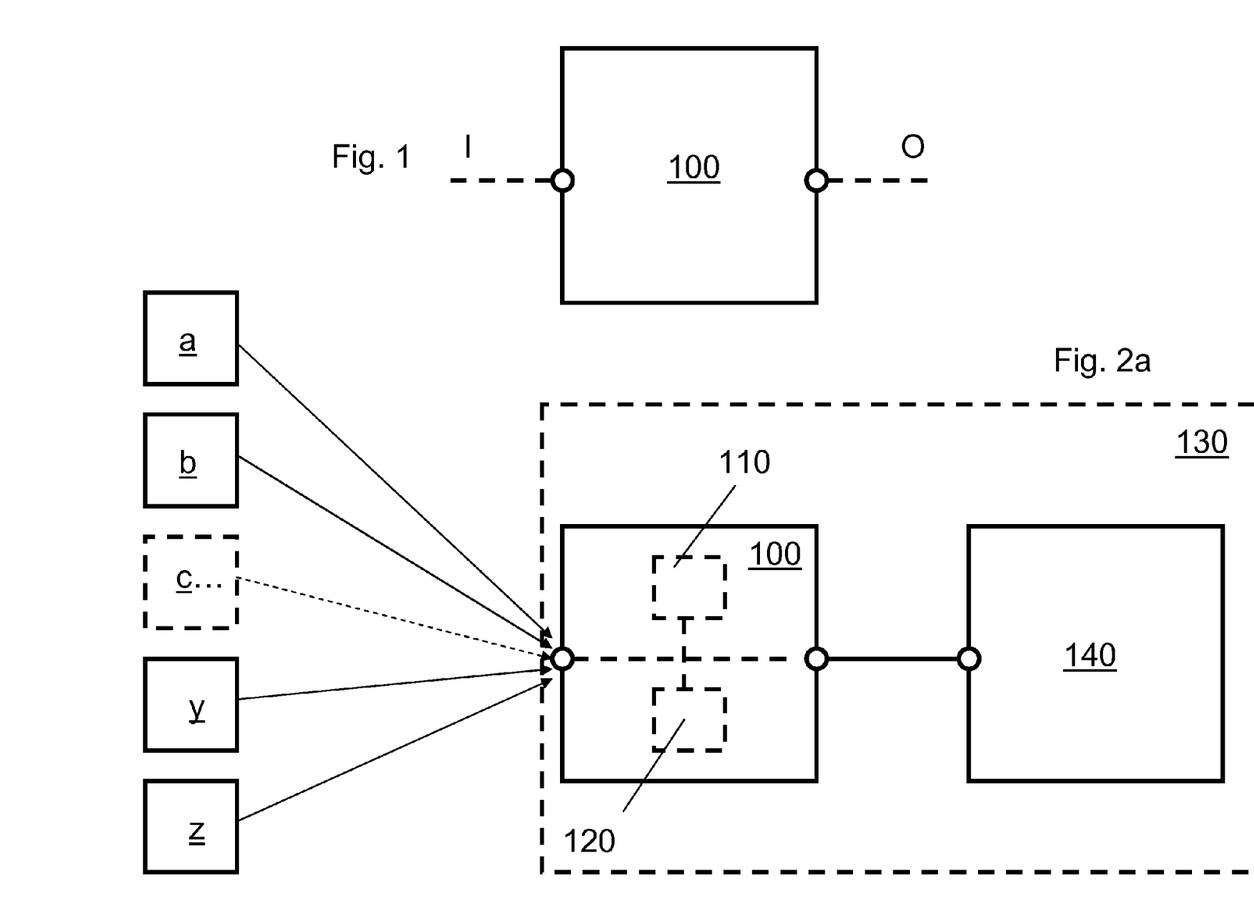
FIG. 1 illustrates an apparatus of an embodiment of the present disclosure.
FIG. 2a illustrates the operation of the apparatus of FIG. 1 in an example context.

We will now describe a first embodiment with reference to FIG. 1.

FIG. 1 illustrates an apparatus 100. In this embodiment the apparatus is a processor, in particular an Application Specific Integrated Circuit (ASIC) processor, although in other embodiments this may be a generic processor programmed by specific software, a series of processors or the like. In particular, this processor 100 is to be integrated as part of a portable electronic device (not shown), the portable electronic device belonging to a user that is streaming/providing personal user data to a plurality of viewers (via the device), although other embodiments where the processor is not part of the portable electronic device, but is on an intermediate server (e.g. see FIG. 6) is also within the present disclosure.

In still other embodiments (which are discussed in detail below) the functionality of aggregating the feedback signalling from a plurality of viewers and/or determination of the graphical indicator for provision to the originator of personal user data can be performed by a cloud server or other intermediary server/servers.

In the present embodiment, a plurality of viewers are viewing the personal user data (or content) originating from a portable electronic device. This device together with the user operating the device can be referred to as an "originator" of the personal user data. The term 'originator' can be understood to encompass a data provision end of a system, in other words, the end of a data stream where the personal user data is created and stems from. Whilst the processor/apparatus 100 could be provided at some intermediary stage between an originator end and a viewer end, the personal user data still comes (at least in part) from the originator.

The apparatus 100 can be connected to an input (I) and an output (O) formed via a connection bus (or the like). The input allows for receiving signalling, and the output allows the apparatus to provide an output (for example, via further signalling).

The input can receive feedback signalling representative of the feedback provided by changes in facial expression of respective viewers to viewing said personal user data provided by the originator. The signalling therefore also provides an indication of the interest value/level of the respective viewers in response to the personal user data (as discussed above).

In this embodiment the ASIC processor 100 comprises a processing block 110, and an internal memory block 120 (not shown in FIG. 1—these blocks 110, 120 within the processor 100 are shown in FIG. 2a). The processing block 110 is for performing all processing operations on any signalling received via the input. The memory block 120 is for storing a set of predetermined criteria (such as instructions, rules, conditions for the processor to operate on the basis of/use as operational parameters, etc). The predetermined criteria are to be used/accessed by the processing block 110/processor 100 as a whole to operate on the signalling via the input of the connection bus.

These functional blocks 110, 120 (together with the connected connection bus) are interconnected internally within the processor 100 to allow for electrical communication between these respective components and to allow the processing block 110 to access the criteria stored on the memory block 120. The formation and configuration of functional blocks within processors to achieve application specific functions are well appreciated by those skilled in the art and will not be discussed further.

In essence, the predetermined criteria set out parameters and/or instructions that can be used by the processing block 110 to interpret the feedback signalling and determined interest value represented by that signalling so as to allow an appropriate graphical indicator to be determined. The memory block 120 (at least in this embodiment) also stores the set of graphical indicators as part of the predetermined criteria (for example, using a look-up table), but in other embodiments the processing block 110 may be configured to actually generate a graphical indicator based on the criteria/rules stored on the memory block 120.

In this embodiment, the predetermined criteria govern processing of received signalling to determine a graphical indicator for display to the originator. There are various schemes that can be used that involve various levels of analysis and operation, and such schemes can involve both qualitative and quantitative analysis of received feedback signalling. Specific examples are discussed in more detail below.

By way of the respective functional blocks, the processor 100 is able to determine a graphical indicator (being a graphical representation of a determined interest value of one or more viewers to the personal user data) for display to the originator of personal user data. This can be seen to act as a graphical measure of the viewer's interest in the content the originator is providing.

It should be noted that in some embodiments the feedback signalling provided to the apparatus 100 may contain raw video data for processing by the apparatus 100. In other embodiments the feedback signalling from the viewer devices may already have been aggregated by another functional element (such as an intermediary cloud server or the like) and therefore the signalling received by the apparatus 100 is purely indicative of the determined interest value for already aggregated feedback signalling.

We will now describe this apparatus 100 in a specific context with reference to FIG. 2a.

In this embodiment, the processor/apparatus 100 is provided as an ASIC processor within an originator device 130. The connection bus (I/O) is formed as part of the originator device 130 and the apparatus/processor 100 is electrically connected to the originator 130 via this connection bus.

In this embodiment the originator device is a laptop (portable electronic device) having a webcam/camera and microphone for providing video and audio content and a wireless Ethernet card for connection to a wireless network (these components are not shown). In other embodiments the originator device can be a mobile telephone also comprising a camera and microphone, or the like. Whilst this embodiment is describing personal user data as being streamed audio/video content, other types of content are within the scope of the present disclosure (such as pre-recorded audio and/or video content, personal user profile/details such as on Facebook, Twitter, etc).

The overall originator 130 is represented by the dashed box in FIG. 2a, and the components of the device 130 other than the processor 100 are denoted by 140 (for example, Central Processing Unit, camera (or webcam), display/viewfinder screen etc). These components can be considered to perform some or all of the other operations of the device (for example, WiFi components for connection to a wireless network, main central processing unit (CPU) and the like). Configurations of such devices are well known and will not be discussed further.

The originator 130 in this embodiment is being used by an originating user to provide streaming live webcam content onto the Internet, although the skilled person will appreciate that other methods can be used to provide such content (teleconferencing, etc).

There are a number of different viewers (a-z) that are viewing the content. Different viewers may be using different types of device or system to view the content (such examples have been discussed above). The viewers' devices each have a video camera or other component that allows for electronic monitoring of the viewers' faces and facial expressions. This can allow for the changes in the viewers' facial expressions to be monitored and provided via feedback signalling to the apparatus/processor 100. It should be noted that the viewer devices may be a dedicated or predetermined group as defined by the originator device. For example, the group may be a group of friends, a group of work colleagues, a group of family members, a combination of one or more of these, or the like. In other situations the viewers may be a group of random viewers or strangers to the originator.

In this embodiment, the feedback signalling only provides video data of respective viewers' faces/heads/bodies, etc to the apparatus 100. The determined interest value is therefore to be determined by the processor 100 upon receiving the feedback signalling based on the predetermined criteria stored in the memory block 120. In other words, the feedback signalling just provides a video stream of the respective viewer's faces, and no other information regarding the viewer's interest level is encoded within the feedback signalling.

Figure 6A:
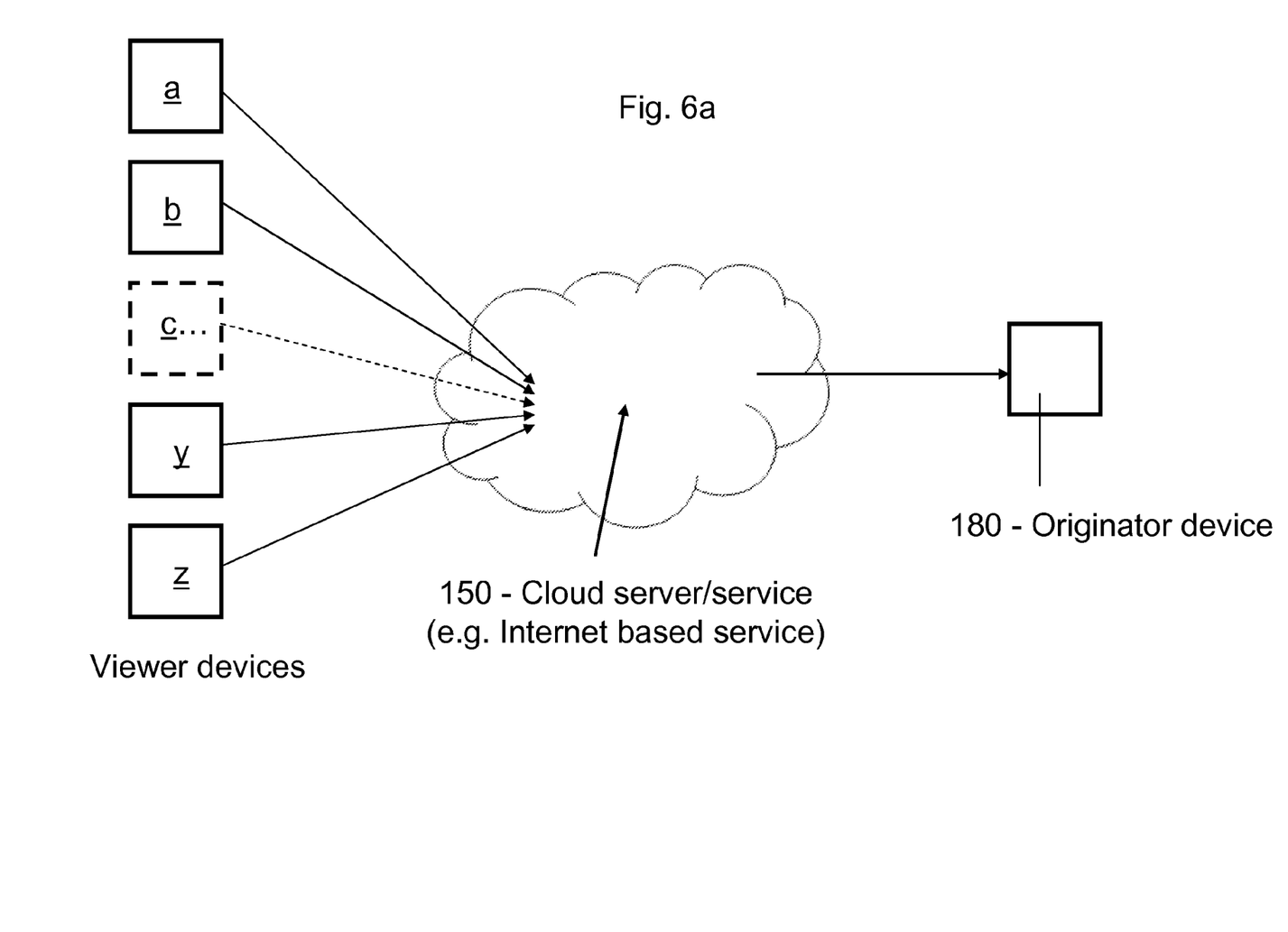
FIGS. 6a and 6b illustrate a cloud server or cloud service embodiment.

In another embodiment, the determined interest value corresponding to the change (or lack of change) in facial expressions of respective viewers is actually determined at the respective viewers' devices, and in other embodiments the determined interest value is calculated still elsewhere prior to provision of the feedback signalling at the apparatus/processor 100 (such as a cloud server—see FIG. 6a and discussion below). In other words, in such embodiments the feedback signalling actually contains a component that provides the determined interest value to the apparatus/processor 100 directly and the apparatus 100 can ascertain aggregated interest of the viewers in the provided personal user data. From this, the apparatus 100 therefore only determines the appropriate graphical indicator to represent that determined interest value to the user of the originator device 130 (at least in some embodiments).

As discussed above, this determined interest value is a measure of the level of interest of one or more respective viewers of personal user data provided by the originator. This may be represented as an actual value having a numerical magnitude, or it may indicate a particular quality (for example, happy, sad, angry, fearful, a viewer's mood, absence of a viewer's face, etc). In some embodiments these qualitative and quantitative measures may be at least partially correlated in some way (for example, the qualitative measures may be assigned quantitative measures or the like). The skilled person will appreciate that there are many schemes that can be used to interpret the information provided by the feedback signalling, and that this may be a qualitative and/or quantitative scheme. A specific example in the context of FIG. 2a is discussed below.

In this embodiment, the memory block 120 stores a set of graphical indicators that corresponds to a determined interest value for the feedback signalling representative of the viewer's interest level. For example, in this embodiment the memory block 120 is storing a happy face symbol (reflecting positive interest), a sad face symbol (reflecting negative interest), and a neutral face symbol (reflect neutral interest). A given face symbol will be returned as the graphical indicator to the originator depending on the determined interest value. This will be made clear in the following description.

We will now describe a specific example of how this embodiment can operate with reference to FIG. 2a.

As has been discussed above, the originator (originator device 130) provides personal user data via live streaming content to a plurality of viewers (a-z). The viewers may have involuntary facial reactions that are monitored (via the viewers' own webcams for example) and returned to the originator device 130 (via apparatus 100) as feedback signalling. As has been said above, in this embodiment the feedback signalling is provided via separate video feeds of the viewers. Each viewer device returns its own feedback signalling that is sent to the processor 100 that is part of the originator device 130.

The processor 100 receives the feedback signalling from the respective viewer devices (a-z). The processing block 120 then operates on the received feedback signalling (utilising the predetermined criteria stored on the memory block 120) to generate the interest value/level of the viewers in the viewed content, and further to determine the graphical indicator that corresponds to that determined interest value.

In this embodiment, the predetermined criteria set forth rules that operate on a quantitative analysis of the received signalling to provide an aggregate determined interest value. The criteria use a particular facial expression rating system to analyse the video feedback signalling of the respective viewers' facial expressions and cause the processing block 110/processor 100 as a whole to allocate a determined interest value of a particular magnitude to respective received signalling (for example, by using the techniques discussed in U.S. Pat. No. 5,774,591).

When a facial gesture is detected there may be some uncertainty involved, and hence such determinations can be approximations. However, in the present embodiment any such issues of 'approximations' will not be detrimental to determining an interest value and providing a corresponding graphical indicator as there will be a number of different viewers to help provide an aggregated (e.g. average, mean, median, etc) interest value and representative graphical indicator.

In particular, utilising feedback from multiple viewers can help to correct for any uncertainties. For example, there may be a given viewer whose facial feedback signalling indicates what could be interpreted as either a smile or a grimace, but it is not independently clear which facial expression it is. By comparing the unknown expression of that feedback signalling against known facial expressions of other signalling, it is possible to eliminate the less likely of the two possibilities. For example, in the case where there are six viewers, five are smiling and one may be smiling or grimacing, it is highly likely that the final uncertain viewer is actually smiling and the grimace can be excluded/discounted. In essence, if other viewers clearly indicate a greater likelihood of one possible expression/gesture over another, then the more likely expression can be selected.

Once such facial expressions have been identified, corresponding interest values should be calculated, and a corresponding graphical indicator must be selected to represent the positive/negative/neutral attributes of the determined interest value.

In this particular example, the determined interest value can be scored as any decimal number from 0 to 3. In essence, the processor 100 identifies the interest level of each viewer from the received signalling and rates it as a numerical value between 0 and 3. As an illustration, each range represents a different category of interest—0 to 1 indicating strong dislike, 1 to 2 indicating somewhat neutral/indecisive (or even no) preference, 2 to 3 indicating strong like. The skilled person will appreciate that larger ranges are possible, and that different numbers and weightings can be assigned depending on the criteria/rules/scheme/rating system used.

The processor 100 then calculates an average (or median) of the respective viewer interest levels that have been scored accordingly to thereby establish an average determined interest value. The average will therefore also place somewhere between 0 and 3. Each category has its own corresponding graphical indicator that is determined to be displayed depending on the average determined interest value. Specifically, in this embodiment, 0 to 1 corresponds to the 'sad face' indicator, 1 to 2 corresponds to the 'neutral face' indicator, and 2 to 3 corresponds to the 'happy face' indicator. Scoring can be further subdivided into discrete scoring/value bands, or may even be continuous. In other embodiments the determined interest value for all viewers may also be performed using an aggregate scoring system.

Figures 2B, 2C, 3, 4:
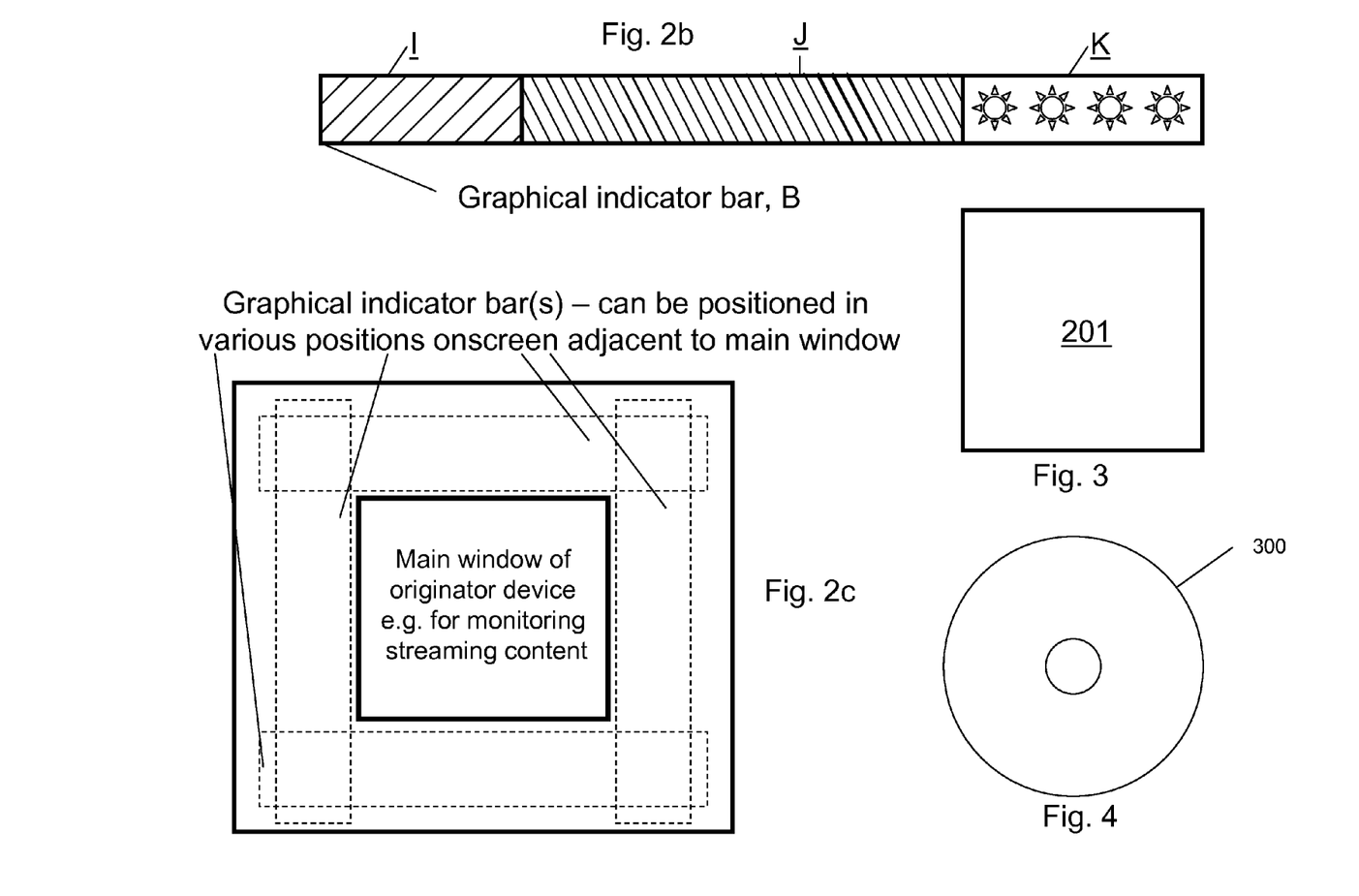
FIGS. 2b and 2c illustrate examples of how facial feedback signalling can be represented to a content creator.
FIG. 3 illustrates the method of operation of an apparatus of the present disclosure.
FIG. 4 illustrates schematically a computer readable medium providing a program according to an embodiment of the present invention.

FIG. 2b illustrates another possible scheme for representing viewers' interest in streamed content/user data to the originator device. This involves actively updating a bar B on the originator device that has different bar regions (I, J, K) that correspond to the respective categories discussed above. In this example, the I portion of the bar corresponds to the 'sad face' category, the J portion corresponds to the 'neutral face' category, and the K portion corresponds to the 'happy face' category. Each portion therefore shows a qualitative measure of viewer interest. In the illustrated example, each portion (I, J, K) is illustrated/rendered differently to each other so as to be distinct from one another.

The length of each bar region is linked to the respective categories, the relative length of each being adjusted/updated based on the number of viewers within each category. Each portion is therefore also a quantitative graphical representation/indicator of the qualitative measure of viewer interest, as the lengths of each portion relative to one another indicate the relative number of respective viewers in each category (e.g. 'sad', 'neutral', 'happy').

Therefore, in the situation where most viewers have neutral preference, then the corresponding centre bar J is the longest (the length being proportional to the number of viewers in this category relative to the total number of viewers and those in the other categories). This can allow for both a quantitative and qualitative representation of viewer interest in the viewed personal user data. In other embodiments the bars may be rendered differently from that shown in FIG. 2b, both in terms of colour, shading, opacity, and the like. Similarly, one or more of the bar portions may be animated so as to flash, blink, shake, move, slide, etc so as to draw the user's attention to one or more of the bar portions (e.g. the largest portion may blink/flash to the user of the originator device to indicate that most viewers fall within that category).

FIG. 2c shows how this bar B could be presented on the display of an originator device. For example, a central/main window can be defined within the centre of the screen, and the bar (or a plurality of bars) can be immediately adjacent to that window. Different orientations of the bar are shown in FIG. 2c to illustrate how this bar B could be provided in conjunction with a main viewing window on an originator device so that a user can simultaneously view the main window and also monitor determined viewer interest level.

Other schemes are also within the scope of the present disclosure. For example, an animated face symbol may be used to qualitatively reflect the changing interest level of the viewers (again, this animated face may blink, flash, move, etc).

In another example, there may be a dedicated symbol for each category (such as sad, neutral, happy, positive, negative etc as discussed above), and each may be rendered in a particular way so as to indicate the category with the most viewers in and to reflect the aggregated interest level of viewers within the different categories. For example, the dedicated symbols may be coloured from one colour that represents relatively low viewer numbers in that category, to another colour that represents relatively high viewer numbers in that category. These could also be animated in a particular way to reflect their importance/ranking relative to one another. For example, the dominating viewer interest indicator could blink or light up whilst the others could remain a static colour (e.g. the dominating indicator is displayed as the brightest symbol). Alternatively, in another example the respective indicators could have varying levels of transparency/opaqueness depending on the number of viewers in each indicator category (so the lower the number of viewers the more transparent the corresponding indicator, and the higher the number of viewers the more opaque the corresponding indicator). These can allow the content creator of the originator device to simply and easily see which category of viewer interest level is dominating (relative to the others) and by how much it is dominating based on the appearance of that particular symbol, particularly in relation to the other indicators. These graphical indicators can be updated in real time to reflect the determined interest value at a given time instance (although it will be appreciated that there may be a time delay between viewers viewing content, providing feedback signalling, and the apparatus determining a graphical indicator for display to the originator).

In an alternative embodiment, there may be situations where the number of viewers is small (e.g. six viewers) and aggregation may not be performed. Instead, where the number of viewers is small, an interest value may be determined for each individual viewer, and a separate graphical indicator depicting feedback for each viewer can be displayed separately at the originator (for example, in the situation where a defined group of six friends are watching an originator's content stream, then a distinct graphical indicator can be provided for each of the 'friend' viewers to the originator).

The graphical indicators may also include or represent one or more of the following:

distinctly coloured dots/squares/icons/logos/faces, gradient changes in colour (e.g. from red (reflecting enjoyment) through yellow (reflecting neutral interest) to blue (uninterested viewers), changing facial logos (e.g. changing facial expressions/gestures/colours/skin/animation/rendering, transition effect such as blinking, flashing, glowing, pulsing, vibration/onscreen oscillation may be used to highlight indicator state changes, etc).

In some embodiments, viewers who are not actively viewing the screen (e.g. whose face is identified as not being focused on the personal user data) are not included for the purposes of identifying interest. For example, the aggregation may involve identifying when a viewer is no longer viewing the personal user data and therefore not take such a viewer's feedback into account until he/she had watched the stream for a consistent period (e.g. more than a given number of seconds).

In the embodiments where there is a particular graphical indicator for each viewer, the graphical indicator for a viewer who is identified as not watching the personal user data at a given time can be dimmed to indicate to the originator that that viewer is not actively observing the content.

Alternatively, in other embodiments a particular interest value can be assigned to those viewers who are identified as not watching the personal user data. For example, if a viewer is not watching the content (despite it being 'viewable' on their viewer screen) then this can be denoted as 'neutral' interest or 'lack of interest', and in some embodiments can be included in the determination of aggregated interest value.

In other embodiments, the predetermined criteria set forth rules that allocate a determined interest value having a particular quality to respective received signalling. For example, one embodiment may have qualitative categories according to emotions/expressions sensed (for example, contempt, disgust, happiness, surprise, etc). The processor can then tally up the number of viewer devices returning a particular quality (for example, three returning disgust, four returning happy, etc) and return an appropriate face corresponding to/representative of that emotion.

In some situations, viewer devices may be watching the same content substantially simultaneously, but the feedback signalling from each viewer device may arrive at different times depending on network connection and the means by which feedback signalling is transmitted back to the apparatus/processor 100. There are also embodiments that are configured to handle such situations. In such situations, the apparatus 100 is configured to counter for this using an allocated feedback window. In essence, the apparatus is configured to receive feedback signalling from different viewer devices only within a pre-allocated time window for receiving feedback. Any signalling received outside this time window will be disregarded, and only signalling received within this window will be used to determine an appropriate graphical indicator. The feedback signalling that is accorded to the appropriate respective feedback window is collected or 'aggregated' to be used in determining interest level and/or graphical indicator to be displayed for that particular time instant.

This is achieved (in some embodiments) by the feedback signalling having a particular timestamp. In essence, the signalling generated by the viewer devices each have a corresponding timestamp to indicate when the signalling was generated/transmitted. This is helpful as the apparatus of the originator device (or cloud server, such as FIG. 6) can use these corresponding timestamps to aggregate and match such corresponding feedback signalling from multiple sources, and to omit feedback data that arrives too late.

For example, the apparatus 100 may be configured to receive signalling within a twenty second feedback time window. Once the twenty second time window has closed, the processing block 110 then operates as above to determine the graphical indicator to be displayed. Any information that arrives after that time window is excluded from that particular iteration. These 'feedback time windows' may be repeated over the course of personal user data being provided and viewed. In some examples, the feedback windows may be immediately adjacent and consecutive, and in some examples the feedback windows may not be immediately adjacent and consecutive.

In another example, an originator of personal user data may set a rule/criterion stating that feedback requests are made at specific regular intervals, such as every 'n' seconds (n=1, 2, 3, . . . ; a default setting could be every 15 seconds, for example). In essence, regular requests are sent out by the apparatus 100 to the viewer devices for feedback signalling, and for each request, feedback signalling is provided. Based on this rule, a feedback request would be made every 'n' seconds. This request would include a timestamp that relates to the corresponding frame/stream position of the personal user data. In response to such feedback requests, the viewer devices will provide their feedback signalling which will also include the same timestamp in their response. This is so that the respective feedback signalling from respective devices can be identified as relevant to a given instance in personal user data, in other words, the apparatus can know to which frame/time/stream position of the personal user data that the response is in relation to.

Alternatively, the rule may actually prescribe that a single request sets up regular sending of feedback signalling from the viewer devices every 'n' seconds as a matter of course, so that only a single request needs to be made to obtain viewer feedback (rather than a single request obtaining a single instance of feedback signalling as above). This is advantageous as less bandwidth will be required due to only one initial request being made by the apparatus to set up the regular provisions of feedback signalling In essence, every nth second when a feedback request has been sent/triggered there is a feedback waiting period, i.e. a feedback window. During this time the apparatus collects the feedback responses/signalling that have the same timestamp as the corresponding feedback request which triggered that particular feedback window. The duration of this window can be adjusted to last for any length of time (e.g. 10 seconds, 15 seconds, 20 seconds, etc) but it will typically be shorter than the time between consecutive/sequential feedback requests (at least in some embodiments).

Alternatively, the window could be ended by a particular condition/rule/criterion being satisfied. For example, once the apparatus has received a particular number of viewer responses the feedback window may be closed/ended (for example, after 10 responses) or when a certain percentage of established viewers have provided feedback (for example, after 50% of viewers have provided feedback).

In one example the apparatus can discard any responses it receives after the closure of the window. In such an example, the apparatus only collects viewer responses that arrive during the feedback window and that are related to a specific timestamp, everything else is discarded.

The collected responses can then be used for determining feedback indicator(s). Once the current feedback indicator(s) for a given time frame/position have been determined then these can be shown on the originator device.

It should be noted that more than one distinct feedback window could be open at a given instant in some embodiments, as one feedback window may begin whilst another is still open for receiving feedback. The apparatus is configured to keep these windows separate and distinct, and to accord/allocate feedback signalling with a particular time stamp to the corresponding feedback window on arrival at the apparatus.

With regard to using such feedback windows, in some embodiments these timeframes/windows can start from the receiving of first feedback sample (for example, as initiated by a feedback request) with a specific timestamp and can end after a time period that is shorter than (or perhaps longer than, or the same as) the sampling frequency (various end conditions for determining have been discussed throughout the present disclosure).

In some situations, certain viewers may have relatively slow feedback connections and may impede the apparatus/processor 100 receiving an adequate amount of feedback to calculate a meaningful graphical indicator. Therefore, in another example, the window may be configured to be of a dynamic/variable length and to close once a certain percentage (for example, 50%) of established viewers have provided feedback signalling. In this way the speed of the system can be optimised as the graphical indicator is determined using signalling provided by the viewer devices with a faster feedback connection.

By providing these feedback time windows, it is possible to provide a more accurate and more meaningful calculation and graphical representation of the overall viewer interest level/value in the content provided by the originator. Whilst this feedback is therefore analysed and monitored in discrete 'chunks' (via these feedback windows) this can provide for substantially real time monitoring of viewer interest levels in the provided content/personal user data.

Figure 6B:
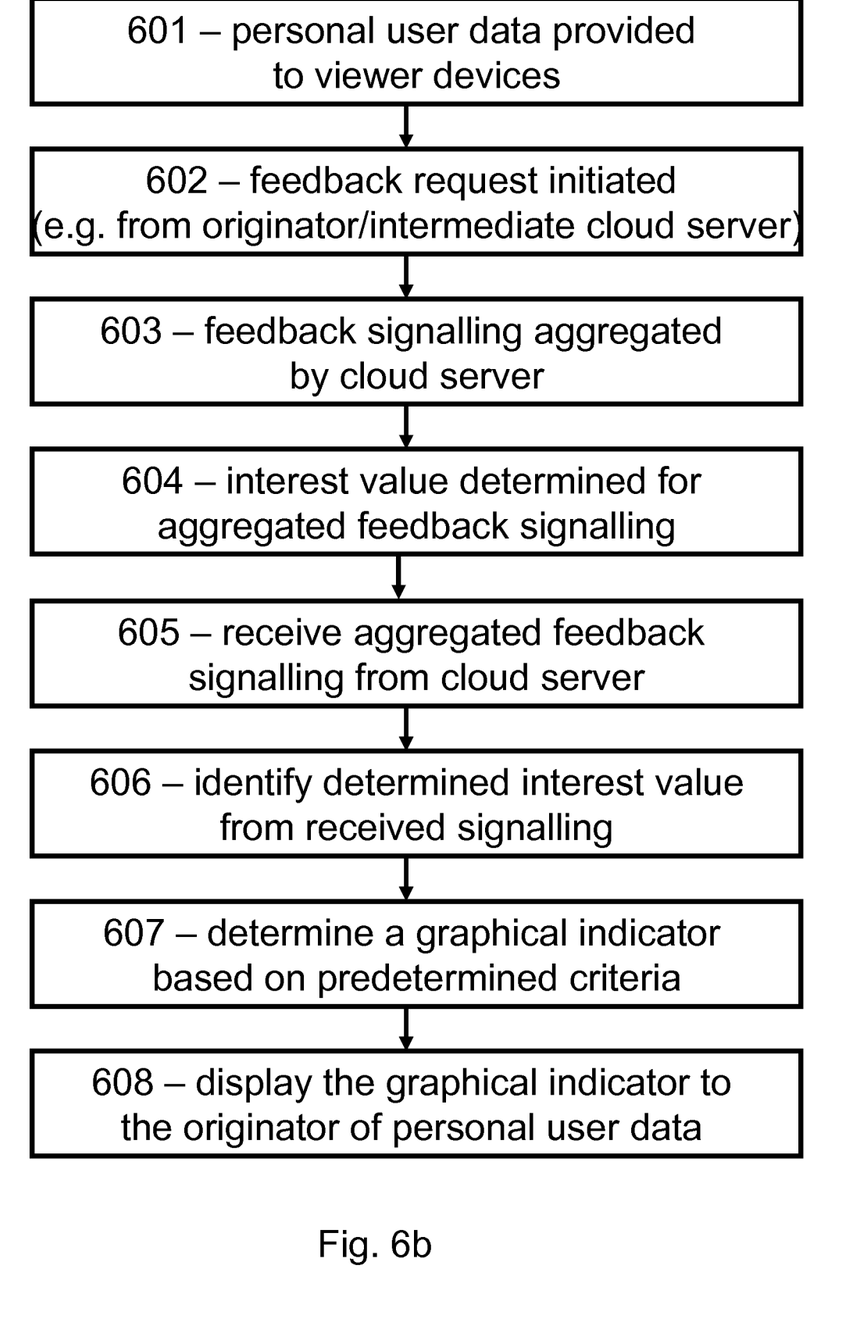

Whilst in the abovedescribed embodiment the functionality of the apparatus 100 is provided as an ASIC processor in an originator device 130, it will be appreciated that the functionality provided by the respective components/elements of the apparatus 100 may be provided separately from the device 130, and be positioned between the originator device 130 and the multiple viewer devices (a-z). For example, the functionality may be provided as part of a content server (such as a 'cloud' server or service) that serves for two-way routing/streaming of information across the Internet (or other means of communication) from the originator device 130 to the respective viewers (a-z). FIG. 6a illustrates how such a server/service could provide the functionality described herein. FIG. 6b illustrates a flowchart depicting an example method of how this would operate.

As has been discussed, in some examples/embodiments, the functionality of determining user interest level and determining a graphical indicator for display to a user is performed via the ASIC processor/apparatus 100 integrated within an originator device. Such implementation may be preferred in more 'professional' scenarios where, for example, the originator device receives all the unprocessed video feedback from each viewer viewing the content, and then the apparatus contained within the device determines the interest value/level and graphical indicator based on the received signalling.

In some scenarios it may be easier to distribute certain aspects of the functionality of the apparatus to reduce the demands placed on the originator device. For example, in some embodiments the feedback signalling received by the apparatus at the originator device can be instead provided by a separate server rather than directly from the viewer devices themselves. This may be a server such as a backend cloud service, which provides a content streaming service using a streaming infrastructure that allows for networking of streaming content from originator devices to viewer devices. For example, www.kyte.com provides such an infrastructure for mobile content providers by creating/providing a channel or channels for live broadcasts.

In relation to the present disclosure, this can provide for one or more alternative embodiments. We will now describe an example embodiment with reference to FIG. 6a.

In this example, an originator device 180 provides content across a cloud server 150 to one or more viewer devices a-z. The viewer devices a-z provide feedback signalling in response to viewing the received content. The flow of signalling (e.g. content, feedback signalling) in this example operates in substantially the same way as the embodiment shown in FIG. 2a. However, in this embodiment, the feedback signalling from the viewer devices a-z is not sent directly to the originator device 180 but is returned via the cloud server/service 150. This cloud server 150 collects or 'aggregates' some or all of the viewer feedback signalling together before onward provision to the originator device 180.

In one example, the cloud server 150 can utilise the feedback windows described above to collect/aggregate feedback signalling in relation to a particular time instant of streamed content from the originator device 180, and then provide the signalling for that feedback window (once collected) onward to the originator device 180, where the interest level can be calculated and the graphical indicator for display determined.

In another example, the cloud server 150 performs the determining of the interest level before onward provision to the originator device 180. In this variation, only the graphical indicator would need to be determined at the originator device 180 end, as the determined interest value would have been computed separately by the cloud server/service 150.

In still other variations, all the determining functionality (i.e. of the interest value/level and of the graphical indicator) can be determined by the cloud server/service, which would analyse the feedback signalling (e.g. the raw video feedback from viewers) and then determine graphical indicator(s) (e.g. facial expressions) to be forwarded to the content originator device. In this way, the content originator device does not have to process the feedback video feed, which as a result is less computationally intensive/demanding on the individual content originator device. The general steps involved in such a server (or similar system/feedback system) are illustrated in FIG. 6b.

Since there are a large number of generic cloud services available in the prior art, it is advantageous to be able to perform facial expression determination using one or more servers/services between viewer and originator devices. This is not only applicable to scenarios where video content is being streamed (which is computationally intensive on processing power) but is also applicable to any type of content aggregator services (for example, Twitter/Facebook etc). These services/platforms can use the facial feedback of viewers (e.g. viewing an originators homepage/profile) in order to establish viewer interest level. Such an infrastructure can therefore implement one or more of embodiments described in the present disclosure to provide facial expression/mood/emotion sensing as a service to content creators.

It should be noted that this cloud/server based facial expression determination may not be necessary and/or critical in all situations, for example where every device (both viewer and originator devices) has the ability to determine user facial expression (i.e. this functionality could be provided as part of the operating/service platform service).

In such scenarios, the viewer devices would also be equipped with a camera mounted on the front of the device for monitoring the viewer's facial expressions in reaction/response to viewed content. The viewer device would process (e.g. using at least one processor such as a generic CPU, ASIC or non-ASIC processor) the monitored facial expressions using instructions encoded to memory on the device to thereby allow the viewer device to determine the observed facial expressions. Once determined, this can be utilised to provide facial feedback signalling, or the determined interest level for that user can be determined at the viewer device end before onward provision to a cloud service or originator device, etc.

To further support such implementations, the viewer device(s) could utilise an operating system/service platform (e.g. such as Windows/Meego/Mac OS/iPhone™ OS/Android/Symbian™ OS) that has an in-built/platform level facial expression sensing service process that utilizes a frontal/front-mounted camera to monitor and thereby determine facial expression as needed. This could also be part of a combined effort with other sensors of the viewer device to help determine overall viewer mood/feeling for other viewer device applications). Once the expression/mood/feeling has been identified for a given viewer operating a given viewer device, then this can be provided onward to the cloud server/service, or further utilised at the viewer device end (in other applications, for example, the viewer may subscribe to facial expression/mood/emotion event messages).

It should be noted that such services/applications need not be local to the viewer device or originator device, but can be remotely located and/or provided as online services that are configured to utilize facial feedback signalling (as described above). For example, a given user's Facebook/Twitter/MySpace (and the like) status could indicate facial expression/emotion/feeling in real-time/according to user specific privacy rules/restrictions.

This can provide for other advantages with such cloud servers/services. For example, in a Twitter tweet feedback scenario a user can see instant viewer feedback on a submitted tweet automatically, a user can also emotion/mood gauge of friends that are visiting some social networking page of the users, and viewers can allow the social networking service to utilize their facial expression/mood/emotion readings and show them to others.

Furthermore, and as will be appreciated from the above description, the respective elements (memory block, processing block) may be provided together or separate from each other. The functionality provided by these elements may even be provided by a plurality of separate/local components (for example, the memory block may be provided/defined by one or more databases stored locally/separately to one another— e.g. a cloud server/service). The skilled person will appreciate that the functionality provided by the above embodiment may be provided in a number of different ways (in hardware, software, circuitry, a combination of these, or the like) without departing from the scope of the present disclosure.

Figure 5:
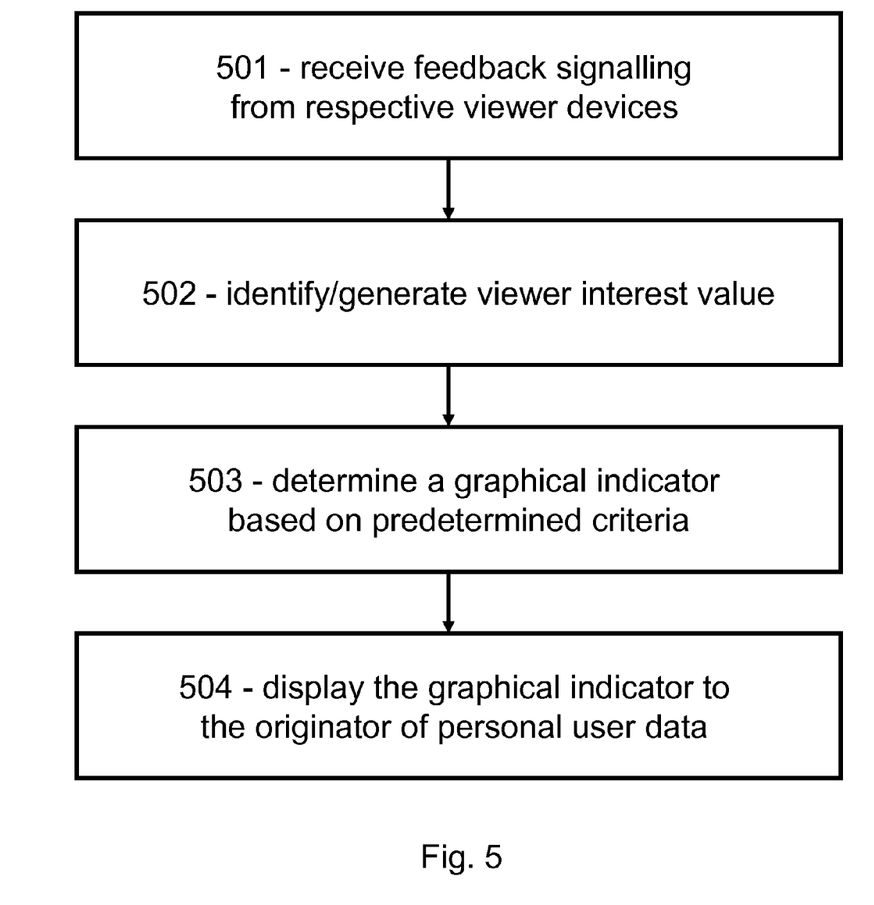
FIG. 5 illustrates a method of operation of an example embodiment.

One or more, or even all, of the above described embodiments can provide for distinct advantages over presently known devices and systems. For example, the apparatus 100 can allow a user of an originator device to monitor, in substantially real time, the interest level of those viewing the originator's personal user data. This can allow the user/originator to actively alter the provision of their content/personal user data in response to positive or negative feedback to enhance their content. Due to the involuntary nature of the feedback generation, this is actually a type of automatic feedback that is provided to an originator. It is also utilising feedback methods that may be more representative of a viewer's actual interest in personal user data. A flowchart showing an example of the abovedescribed method of operation is illustrated in FIG. 5.

Each of the blocks 501-504 may or may not be conducted by the same processor/apparatus/server. For example, steps 501 and 502 can be performed/implemented on an intermediate cloud server type apparatus (see cloud server 150 of FIG. 6), and steps 503 and 504 can be performed by the originator device 180 (see FIG. 6). In other embodiments, step 503 may also be done by the cloud server apparatus 150.

With regards to step 503, the criteria that are used to determine the interest level may utilise rules/conditions/parameters/instructions as set out in embodiments above so as to aggregate feedback signalling and determine an interest level in respect of signalling from respective viewer devices (as discussed above, see U.S. Pat. No. 5,774,591 for an example).

Whilst the above embodiments are chiefly directed at monitoring viewer interest in live applications, the teachings of the present disclosure can also be applied to situations where people are viewing pre-recorded content. This can provide a meaningful, moment-by-moment analysis of viewer interest in a particular piece of content, whereas known devices/systems do not afford such advantages. It should also be noted that there are some embodiments in which the apparatus does not receive video feeds as feedback signalling, but the received feedback signalling is in a pre-processed format from the viewer devices. In such embodiments, some or all of the viewer devices may have face recognition software/hardware platforms which provide feedback signalling in a common/standard-compliant pre-processed format. This feedback signalling can be used to determine the interest value. The determined interest value is thus determined separately from the determination of a graphical indicator. In such embodiments the apparatus receives signalling that provides the determined interest value for the viewers, and this is then used to determine the graphical indicator.

FIG. 3 illustrates the flowchart of the method of operation of another embodiment. This comprises:

201—determining a graphical indicator for display to the originator of personal user data, the graphical indicator being a graphical representation of a determined interest value of one or more viewers to the personal user data, the determined interest value being generated using feedback signalling representative of the feedback provided by changes in facial expression of respective viewers to viewing said personal user data.

The manner in which this is performed and achieved has been discussed at length above, and will not be discussed further.

FIG. 4 illustrates schematically a computer/processor readable media 500 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, for example, switched on, or the like. In such cases, they may not necessarily have the appropriate software loaded into the active memory in the non-enabled (for example, switched off state) and only load the appropriate software in the enabled (for example, on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (for example, memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (for example, including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
    at least one processor; and
    at least one non-transitory memory including computer program code,
    the at least one non-transitory memory and the computer program code are configured to, with the at least one processor, cause the apparatus to perform at least the following:
        determine a graphical indicator,
        display the graphical indicator on a portable electronic device, the graphical indicator being a graphical representation of a determined viewer interest level of one or more viewers to personal user data, the determined viewer interest level being generated using feedback signalling representative of the feedback provided by involuntary changes in facial expression of respective ones of the one or more viewers to viewing said personal user data by approximations of reactions indicated by the viewers' facial expressions;
    wherein the at least one memory and the computer program code are configured to, with the at least one processor, cause the apparatus to be able to: receive said feedback signalling; and generate the determined viewer interest level using the received feedback signalling; and
    wherein the at least one memory and the computer program code are configured to, with the at least one processor, cause the apparatus to be able to: generate the determined viewer interest level using the received feedback signalling in accordance with at least one predetermined set of criteria which allow for interpretation of said received feedback signalling to determine changes in facial expression of respective viewers viewing said personal user data, wherein the at least one predetermined set of criteria comprises at least one of instructions, rules, conditions for operating a processor, and conditions for use of a look-up table.

2. The apparatus as claimed in claim 1, wherein the personal user data is generated by the originator using a portable electronic device.

3. The apparatus as claimed in claim 1, wherein the at least one predetermined set of criteria comprises at least one expression rating system.

4. The apparatus as claimed in claim 1, wherein the determined viewer interest level of the one or more viewers is a measure of respective viewer's responses to the personal user data being viewed.

5. The apparatus as claimed in claim 1, wherein the graphical representation provides a representation of the magnitude of the determined viewer interest level based on compiling interest values from a plurality of viewers.

6. The apparatus as claimed in claim 1, wherein the at least one memory and the computer program code are configured to, with the at least one processor, cause the apparatus to be able to: determine a graphical indicator output being graphically representative of the magnitude of the determined viewer interest level.

7. The apparatus as claimed in claim 1, wherein the at least one memory and the computer program code are configured to, with the at least one processor, cause the apparatus to be able to: determine a graphical indicator output being graphically representative of one or more qualities of the determined viewer interest level.

8. The apparatus as claimed in claim 1, wherein the determined viewer interest level comprises one or more components of: viewer facial expression, and viewer mood.

9. The apparatus as claimed in claim 1, wherein the determined graphical indicator includes one or more of: distinctly coloured dots, squares, icons, logos and faces; gradient changes in colour; changing facial logos; changing facial expressions; gestures; colours; skin; animation; rendering; transition effects; blinking; flashing; glowing; pulsing; vibration and oscillation.

10. The apparatus as claimed in claim 1, wherein the at least one memory and the computer program code are configured to, with the at least one processor, cause the apparatus to be able to: receive feedback signalling in response to one or more feedback requests performed at regular intervals, the feedback requests having one or more feedback time windows associated therewith and wherein the respective feedback signalling has a corresponding timestamp associated therewith; aggregate received feedback signalling having a particular timestamp to a corresponding feedback time window; and generate the determined viewer interest level for a particular feedback time window using the received feedback signalling aggregated to that particular respective feedback time window.

11. The apparatus of claim 1, wherein the apparatus is selected from one or more of the following: an electronic device, a portable electronic device, a mobile phone, a server, cloud server, system, feedback system, and a module for any of these.

12. The apparatus of claim 1, where the involuntary changes in facial expression are at least partially subconscious.

13. A method comprising:
 determining a graphical indicator,
 displaying the graphical indicator on a display screen of a portable electronic device, the graphical indicator being a graphical representation of a determined viewer interest level of one or more viewers to personal user data, the determined viewer interest level being generated by circuitry using feedback signaling representative of feedback provided by involuntary changes in facial expression of respective ones of the one or more viewers to viewing said personal user data;
 receiving said feedback signalling; and generating the determined viewer interest level using the received feedback signalling; and
 generating the determined viewer interest level using the received feedback signalling in accordance with at least one predetermined set of criteria which allow for interpretation of said received feedback signalling to determine changes in facial expression of respective viewers viewing said personal user data, wherein the at least one predetermined set of criteria comprises at least one of instructions, rules, conditions for operating a processor, and conditions for use of a look-up table.

14. The method as claimed in claim 13, comprising: determining a graphical indicator output being graphically representative of the magnitude of the determined viewer interest level.

15. The method as claimed in claim 13, comprising: determining a graphical indicator output being graphically representative of one or more qualities of the determined viewer interest level.

16. The method as claimed in claim 13, comprising: receiving feedback signalling at regular intervals in response to one or more feedback requests, the feedback requests having one or more feedback time windows associated therewith and wherein the respective feedback signalling at regular intervals has a corresponding timestamp associated therewith; aggregating received feedback signalling having a particular timestamp to a corresponding feedback time window; and generating the determined viewer interest level for a particular feedback time window using the received feedback signalling aggregated to that particular respective feedback time window.

17. A non-transitory computer readable medium comprising a computer program stored thereon, the computer program comprising computer code configured to, when run on a processor, perform at least the following:
 determine a graphical indicator,
 display the graphical indicator on a portable electronic device, the graphical indicator being a graphical representation of a determined viewer interest level of one or more viewers to personal user data, the determined viewer interest level being generated using feedback signalling representative of feedback provided by involuntary changes in facial expression of the one or more respective viewers to viewing said personal user data;
 receive said feedback signalling; and generate the determined viewer interest level using the received feedback signalling; and
 generate the determined viewer interest level using the received feedback signalling in accordance with at least one predetermined set of criteria which allow for interpretation of said received feedback signalling to determine changes in facial expression of respective viewers viewing said personal user data, wherein the at least one predetermined set of criteria comprises at least one of instructions, rules, conditions for operating a processor, and conditions for use of a look-up table.

* * * * *